Sept. 19, 1939.   H. F. PATTERSON   2,173,659
MOTOR VEHICLE POWER TRANSMISSION
Original Filed May 11, 1934   3 Sheets-Sheet 2

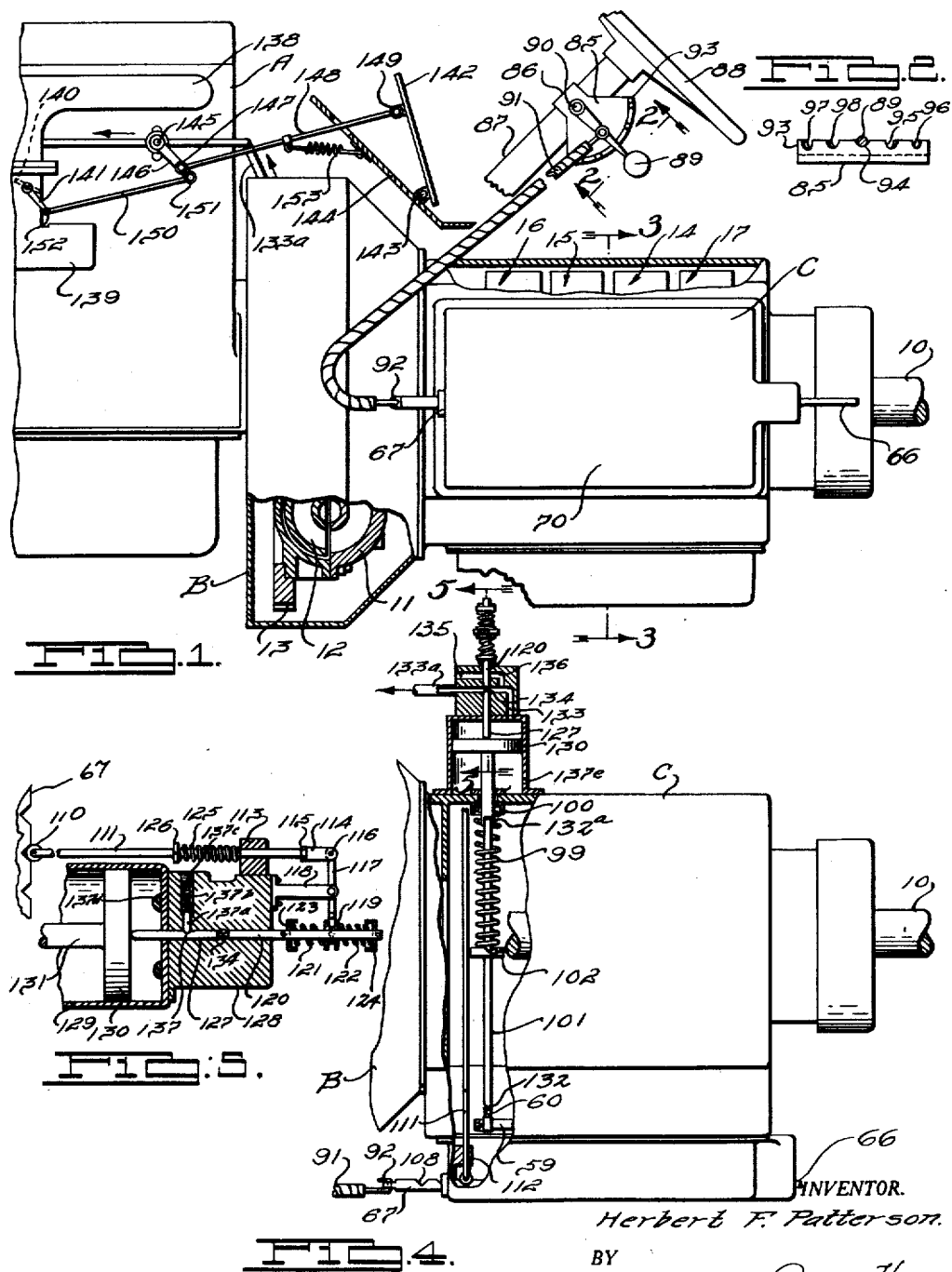

INVENTOR.
Herbert F. Patterson.
BY
Harness, Dins, Pitee, & Harris
ATTORNEYS.

Sept. 19, 1939.    H. F. PATTERSON    2,173,659
MOTOR VEHICLE POWER TRANSMISSION
Original Filed May 11, 1934    3 Sheets-Sheet 3

INVENTOR.
Herbert F. Patterson.
BY
ATTORNEYS.

Patented Sept. 19, 1939

2,173,659

UNITED STATES PATENT OFFICE 2,173,659

MOTOR VEHICLE POWER TRANSMISSION

Herbert F. Patterson, St. Clair Shores, Mich., assignor to Chrysler Corporation, Detroit, Mich., a corporation of Delaware Application May 11, 1934, Serial No. 725,223
Renewed December 13, 1937

44 Claims. (Cl. 74—262)

This invention relates to power transmission devices and refers more particularly to improvements in power transmission systems especially adapted for use in connection with motor vehicles, although not necessarily limited thereto.

My invention, in certain more limited aspects thereof, provides improvements in the drive and control for power transmission systems of the type including the well-known epicycle or planetary transmission gear box. With such planetary transmissions, it is customary to arrange the gearing to provide for the desired number of speed ratios between the engine and vehicle driving ground wheels and such gearing is customarily selected and controlled to obtain the desired driving speed ratio by actuation of any one of a group of transmission gearing controlling mechanisms or devices usually consisting of reaction brake bands associated with and controlling the rotation of corresponding drums or similar elements of the various planetary gear trains.

One object of my invention resides in the provision of an improved selector and actuating mechanism for obtaining the several speed ratios provided by the transmission or other speed changing mechanisms, the latter preferably being of the planetary gear type although not necessarily limited thereto in the broader aspects of my invention.

A further object of my invention is to provide selectively adjustable means adapted for movement into operative association with each of the speed ratio controlling devices of the transmission. More particularly, according to one embodiment of my invention, this common means may be in the form of an adjustable element adapted to be selectively positioned in response to a manually actuated selector controlling device. This adjustable element preferably has movement of rotation in opposite directions on its axis and longitudinal or sliding movement in opposite directions along its axis, one of these movements providing for control of the operation of the speed ratio controlling devices (either to engage or disengage such devices) and the other movement providing for selection of the desired speed ratio controlling devices. This adjustable element preferably controls or forms an operative connection between a power operating means and the various transmission speed ratio controlling devices. The illustrated embodiment of my invention represents one typical form of my invention in which I have demonstrated the principles of my invention by arranging the adjustable element to have its selective control by the sliding movement.

A further object of my invention, in the more limited aspects thereof, is to provide a selectively adjustable actuating cam preferably adjustable in response to manual manipulation by the vehicle driver for selectively controlling or establishing an operative connection between a suitable power operating means and the various transmission speed ratio controlling devices.

Where a planetary gear type of transmission is employed in connection with my invention, the aforesaid common actuating cam is arranged for a toggle-like action and is adapted to selectively control or operably connect a power operating means selectively with the various braking devices for the respective planetary gear trains to selectively operate the braking devices in response to manual selection by the motor vehicle driver.

A further object of my invention resides in the provision of improved controlling and actuating mechanism for selecting and manipulating the transmission to establish the various gear trains, particularly in a planetary type of transmission, whereby improved means is provided responsive to manual control by the motor vehicle driver for automatically bringing about a complete cycle of gear ratio change. In the present embodiment of my invention, this manual control is so arranged that the gear ratio changes will be automatically effected in response to manual manipulation of a selector control element. Alternatively, the manual control may be operated preselectively so that gear ratio changes are effected subsequently to manipulation of the manual selector element and in response to operation of a further manual control device. In either instance, and as a further feature of my invention, power operating means is provided to act under control of the manual means through a common selector operating element which establishes operating connection with the various gear control devices or rotary control elements.

A further object of my invention resides in the provision of improved fluid pressure operating means or power actuating means to furnish the necessary power for actuating the adjustable operating element in one direction of its power movement in controlling the operation of the several speed ratio controlling devices or braking means in the case of a planetary transmission. This power actuating means is preferably arranged to release or disengage the aforesaid speed ratio controlling devices although, if desired, the power actuating means may be arranged to engage these devices. Where my improved power actuating means is used to release the speed ratio controlling devices as aforesaid, I preferably provide other power means such as a relatively heavy spring or other suitable power moving means to actuate the adjustable element in the other direction of its power movement to engage the various speed ratio controlling devices, the operation of the two power means being under control of the vehicle driver.

A further object of my invention in a more limited aspect thereof is to provide a fluid pressure operating means in the form of air at less than atmospheric pressure. I preferably utilize the vacuum intake system of the engine under control of the vehicle operator in a novel manner for releasing the various transmission speed ratio controlling devices and thereafter effecting their selective operation automatically. The fluid pressure medium employed in this embodiment of my invention may, if desired, be oil under pressure or air under pressure above atmospheric pressure, or other suitable fluids. The accelerator pedal may be conveniently used to control the fluid pressure operating means when it is desired to operate the speed changes preselectively.

A further object of my invention is to provide an improved preselector arrangement whereby the vehicle driver may manually select for the desired transmission speed ratio in advance of the speed ratio change, the change in speed ratio preferably occurring, according to this phase of my invention, in response to operation of a further manually controlled device such as a foot pedal which may be the usual accelerator pedal, for example. By manually selecting for the desired speed ratio with the accelerator pedal in its released position, as when the vehicle is allowed to coast and drive the engine, the selected speed ratio will be obtained in automatic response to manipulation of the selector control element without requiring the operation of any further manual devices.

Another object of my invention is to provide an improved clearance take-up mechanism for the braking devices of the various controlling devices° especially adapted to maintain a predetermined clearance for the operating brake shoes whereby the toggle-like cam may be efficiently operated.

A planetary type of transmission presents a number of advantages over the more conventional sliding gear types of transmissions, and my invention is therefore primarily directed toward planetary types of transmissions and power transmitting systems employing planetary gearing speed ratio controlling devices although, as aforesaid, the fundamental principles of my invention may, if desired, be employed in connection with transmissions of other types including the aforesaid sliding gear types of transmissions.

By way of example in connection with the aforesaid advantages of the planetary transmission over more conventional types, it may be noted that the planetary transmission permits gear changes without the necessity of releasing the main clutch between the engine and transmission to obtain relatively quick gear changes and faster acceleration of the motor vehicle. This is made possible not only by reason of the inherent slipping in the fluid coupling but also by reason of the fact that the braking devices associated with the respective planetary gear trains are, in effect, clutches in that each rotary drum controlling a planetary train is frictionally engaged by its associated braking means.

Further objects and advantages will be apparent from the following detailed description of one illustrative embodiment of the principles of my invention, reference being had to the accompanying drawings, in which:

Fig. 1 is a side elevational view illustrating my power transmission mechanism as a whole, portions of the transmission and clutch casings being broken away to illustrate the speed ratio gear train controls and main clutch parts respectively.

Fig. 2 is a detail side elevational view partly in cross section illustrating the manual selector device, the section being taken along the line 2—2 of Fig. 1.

Fig. 4 is a side elevational view of the transmission with parts thereof broken away to illustrate the power operating means for controlling engagement and disengagement of the speed ratio controlling devices.

Fig. 5 is a detail sectional view illustrating a portion of the power actuating means shown in Fig. 4, the section being taken along the line 5—5 of Fig. 4.

Figure 3:
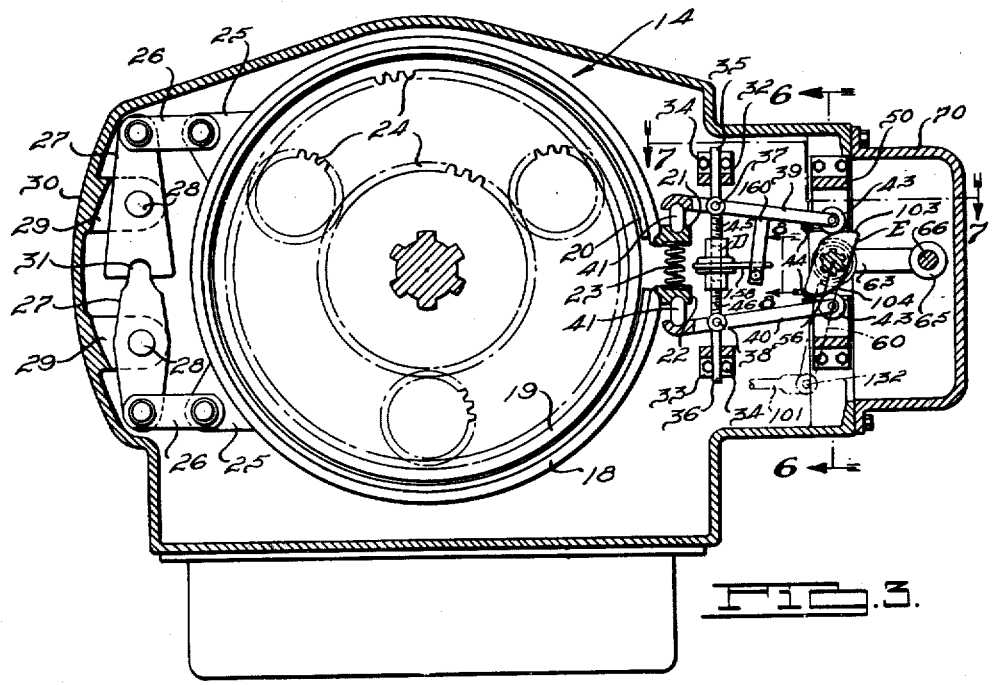
Fig. 3 is a sectional elevational view through the transmission illustrating one of the speed ratio controlling devices and parts associated therewith, the section being taken along the line 3—3 of Fig. 1.

Referring to the drawings, I have illustrated my invention in connection with a motor vehicle drive, this drive including a prime mover or engine A, a portion of which is shown in Fig. 1, a main clutch B driven from the engine, and a change speed transmission or gear box C driven from the clutch B. The drive passes through the transmission to a power take-off shaft 10 which, as usual, may extend rearwardly of the vehicle to drive the usual ground wheels (not shown).

The clutch B may be of any suitable construction for controlling the drive between engine A and transmission C, this clutch being illustrated in Fig. 1 in the form of a fluid type having the usual driving and driven cooperating vane members 11 and 12 respectively. The driving vane member 11 is carried by the engine flywheel 13 and the driven vane member 12 is connected to an operating shaft which leads rearwardly to drive the transmission C, this shaft not being illustrated.

I have illustrated a fluid type of clutch B since a clutch of this character has a number of advantages in connection with a transmission of the planetary gear type as illustrated at C. Thus, the fluid type of clutch is desirable in providing a smooth drive for the vehicle through the planetary transmission, relatively high power driving efficiency, automatic release of the drive between the engine and transmission when the engine is idling and with the transmission manipulated to establish one of its driving gear ratio settings, and other well-known favorable characteristics. I desire to point out that other types of clutches may be employed to control the drive between engine A and transmission C, if desired. For example, the well-known type of friction clutch may be employed and may be manually operated or automatically operated by the well-known commercial type of vacuum clutch releasing mechanism as will be readily understood.

I have illustrated the change speed transmission C as the epicyclic or planetary type, this general form of transmission being well known in the art, and as usual includes a plurality of transmission speed ratio controlling clutches or brakes 14, 15, 16 and 17, these braking devices being respectively adapted to actuate the transmission in its first speed gear ratio or low gear, second speed ratio or intermediate gear, third speed ratio, and reverse drive.

The typical brake device 14 as illustrated in Fig. 3 consists of an outer band 18 which substantially surrounds the drum 19, the band being adapted for frictional engagement with the drum by reason of the friction braking material 20 carried by the band. The band has its ends formed with laterally projecting actuating flanges 21 and 22 positioned adjacent each other, means being provided to move the band ends toward each other to contract the band 18 for causing the friction material 20 to brake the rotary drum 19, the band having sufficient inherent resilience to expand away from contact with the drum when the actuating means is relieved at the flanged ends 21 and 22. I have also illustrated a spring 23 yieldingly acting to separate the band ends and thereby assisting the springing action of the band 18. In Fig. 3 the first speed ratio braking device 14 is illustrated in its inoperative position whereby the drum 19 is free to rotate through operation of the planetary gear set 24 somewhat diagrammatically illustrated in association with the drum 19. When the braking device 14 is actuated or engaged by contracting the band 18, the drum 19 is held against rotation, the driven shaft 10 in such instance being operated through the planetary gearing 24 to provide the first speed drive for the motor vehicle.

In order to anchor the band 18 and to substantially equalize the braking forces applied to drum 19 around the periphery thereof to substantially avoid a tendency toward lateral loading of the drum and planetary gearing transverse to the axis of the drum, I have provided the band with the circumferentially spaced anchoring flanges 25. The flanges are connected through links 26 with the levers 27 pivotally mounted at 28 with the supporting brackets 29 of the transmission casing 30, the levers 27 being interlocked at 31 so that movement of one of the flanges 25 will be transmitted through the pivotal levers 27 and the links 26 to the other portion of the band associated with the anchoring device. The links 26 are thus pivotally connected at their opposite ends respectively with the anchors 25 and levers 27.

Figure 7:
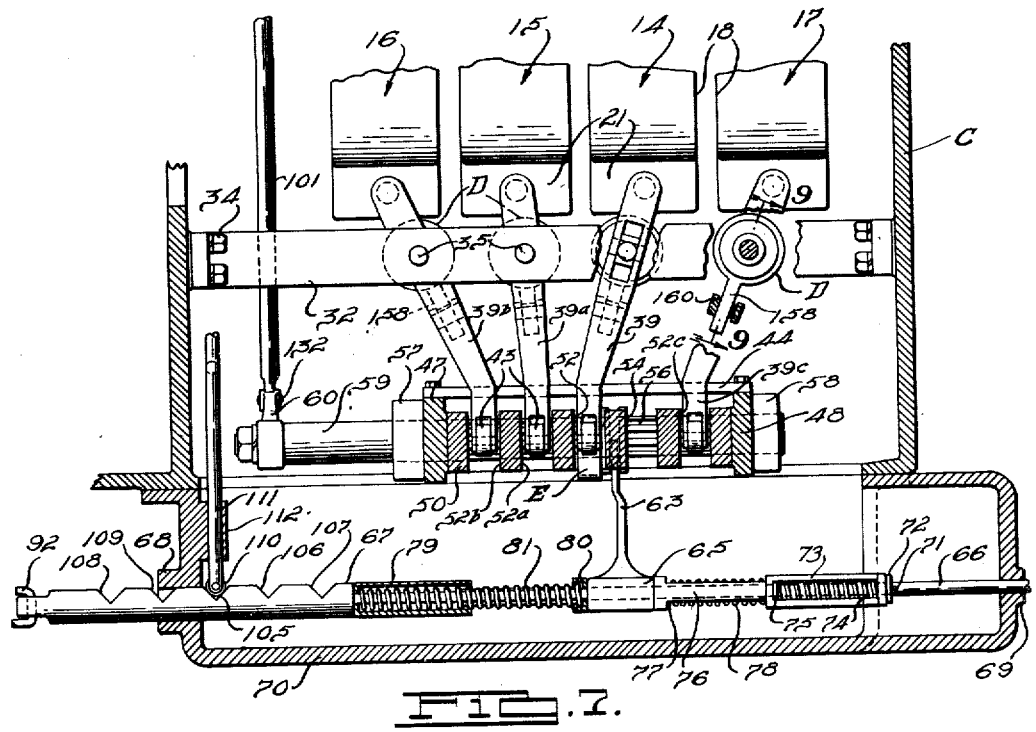
Fig. 7 is a sectional plan view of the mechanism illustrated in Fig. 6, the section being taken along the line 7—7 of Fig. 3.
Figures 9, 10:
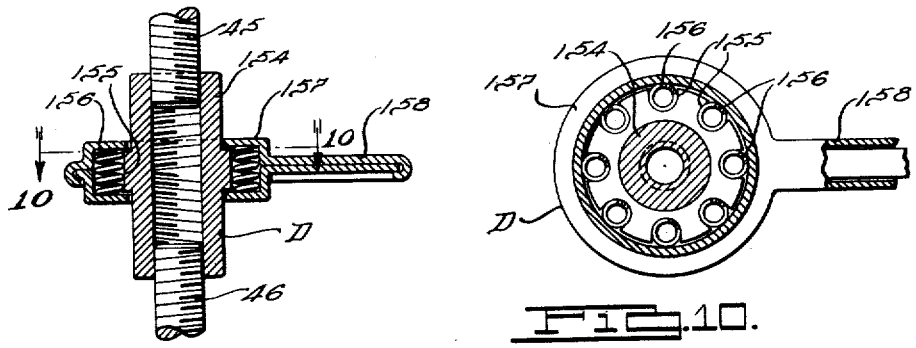
Fig. 9 is a detail sectional view of the clearance take-up mechanism of Fig. 8, the section being taken along the line 9—9 of Fig. 7.
Fig. 10 is a further sectional view of the clearance take-up mechanism, the section being taken along the line 10—10 of Fig. 9.

In order to operate the speed ratio controlling device 14 and more specifically to contract the band 18 thereof, the following mechanism is provided. Extending longitudinally within the transmission casing and to one side of the controlling devices are the upper and lower guide brackets 32 and 33 suitably connected to the end walls of the transmission casing by fasteners 34 as best indicated in Fig. 7. These brackets 32, 33 have aligned openings opposite each of the speed ratio controlling devices to slidably receive the fulcrum guide rods 35 and 36 for the respective fulcrums 37, 38 of levers 39 and 40. These levers are fulcrumed intermediate their ends, the inwardly extending relatively short lever arm portions of levers 39 and 40 being respectively connected through links 41 to actuate the band flanges 21 and 22. The outwardly extending lever arm portions carry rollers 43, these rollers being spaced apart a predetermined amount when inoperative by the lever stops 44.

The lever fulcrums 37 and 38 are connected together by the oppositely threaded shafts 45, 46 and the clearance take-up device D which will be hereinafter more fully described. When the rollers 43 carried by levers 39 and 40 are forced apart away from the stops 44 by the power operating means which will be presently described, it will be apparent that the levers are actuated on their respective fulcrums 37, 38 so as to bring the band ends 21, 22 toward each other to engage the braking material 20 with the drum 19. It will furthermore be apparent that inward movement of the fulcrums 37, 38 toward each other produced by inward movement of the guide rods 35, 36 will reduce the clearance between the friction material 20 and drum 19, this clearance being preferably maintained relatively small in order to reduce the amount of movement of the levers and operating mechanism therefor in actuating the braking device. As will be presently apparent, the clearance take-up mechanism D will automatically respond to an abnormal movement of the levers, such as would be occasioned by excessive band wear and resulting clearance with the drum beyond a predetermined amount, the take-up device acting to move the lever fulcrums an amount sufficient to automatically restore the clearance initially provided in the mechanism.

In order to avoid repetition I have not illustrated all of the details of this brake operating means associated with the controlling devices 15, 16 and 17, it being understood that the operating means therefor is similar to that described in connection with the controlling device 14 with the exception that the actuating levers corresponding to levers 39 and 40 have relatively different lengths in order to position the outer ends of the levers closely adjacent each other as best seen in Fig. 7. Thus, the controlling devices 15, 16 and 17 have cooperating pairs of actuating levers best seen in Figs. 6 and 7 and respectively designated at 39$^a$, 40$^a$; 39$^b$, 40$^b$; and 39$^c$, 40$^c$. The levers of each pair have bent portions and they are directed to position the actuating rollers 43 in longitudinal alignment as to the upper and lower groups of levers.

Vertically connecting the upper and lower walls of the transmission casing are the laterally spaced supporting walls 47 and 48 and extending between these walls and connected thereto by the fasteners 49 is the guide bracket 50 adjacent the upper part of the casing and also a second guide bracket 51 similarly supported adjacent the lower part of the casing. The upper and lower brackets 50 and 51 are provided with cooperating pairs of slots or openings adapted to respectively receive and guide the outer ends of the aforesaid pairs of actuating levers associated with each of the speed ratio controlling devices.

Figures 6, 8:
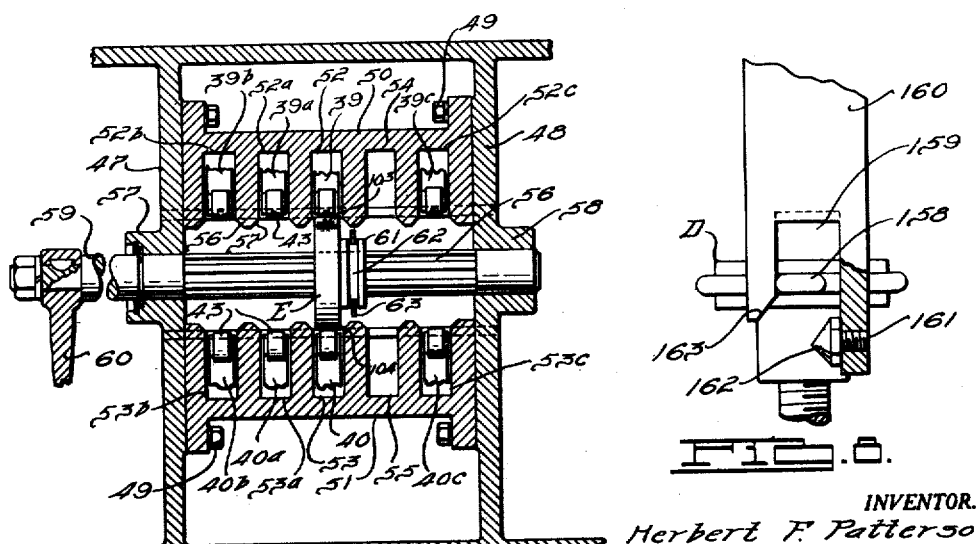
Fig. 6 is a side view in cross section of the sliding toggle cam and parts associated therewith, the section being taken along the line 6—6 of Fig. 3.
Fig. 8 is a detail side elevational view partly broken away showing the clearance take-up mechanism, the view being taken as indicated by the line 8—8 in Fig. 3.

Thus, in Fig. 6 it will be noted that bracket 50 is provided with the downwardly opening slot 52 vertically aligned with the upwardly opening slot 53 of bracket 51, these slots respectively receiving the outer ends of levers 39 and 40 as will also be apparent from Fig. 3. The brackets 50 and 51 are additionally formed with pairs of aligned slots for the aforesaid pairs of levers associated with the other controlling devices, these pairs of slots being designated at 52ª, 53ª for the levers of the second speed controlling device, 52ᵇ, 53ᵇ for the levers of the third speed controlling device, and 52ᶜ, 53ᶜ for the levers of the reverse controlling device. The brackets 50, 51 are also respectively provided with the further slots 54, 55 which may be termed the neutral slots of the brackets. It will be noted that the inner faces of the brackets 50 and 51 intermediate the ends of the slots are oppositely beveled as indicated at 56, 57 toward adjacent slots in order to facilitate entry into the aligned slots of the common adjustable operating element E and to compensate for any minor misalignments as will presently be more apparent.

The adjustable actuating element E in the present form of my invention consists of a toggle-like cam slidably mounted on a splined shaft 56, this shaft being mounted for power oscillation in the bearings 57, 58 respectively provided by the casing walls 47 and 48. The shaft 56 has a forwardly extending portion 59 to which is secured the downwardly extending actuating lever 60. The power operating means for oscillating the lever 60 in order to alternately actuate and release the pairs of levers associated with the controlling devices will be presently described.

In order to selectively adjust the cam E slidably along the splined shaft 56 in selective engagement with the rollers 43 of the pairs of levers, the cam E is provided with a shift collar 61 having an annuler groove 62 engaged by the inwardly extending yoked lever 63. The mechanism illustrated in my drawings, according to one phase of operation thereof, is of the preselector type wherein manually operated means yieldingly urges slidable adjustment of the cam E in advance of sliding adjustment thereof whereby a selection may be made while the cam E is operatively engaged with one of the speed ratio controlling devices. My gear ratio changing mechanism may also be operated in direct response to manual selection. The mechanism for producing the preselector control is best illustrated in Figs. 2 and 7 werein it will be noted that the lever 63 projects inwardly from the carrier 65 which is freely slidable along a reduced portion 66 of the shaft 67, this shaft being journaled in the bearing guides 68, 69 formed in the respective enu walls of a casing cover 70 removably secured to the main body of the transmission casing 30.

The shaft portion 66 is provided with a fixed pin 71 engaged by a washer 72, the latter in turn being engaged by a forwardly opening cup 73 formed with one or more slots 74 slidably receiving the bent flange or tongue 75 carried by the arm 76 of a second cup 77, the latter cup opening rearwardly. The cup 77 is freely slidable along the shaft portion 66 and bears against the carrier 65, a preloaded coil spring 78 yieldingly urging the cup 77 forwardly along the shaft portion 66 and away from the cooperating cup 73, this separating movement being limited by engagement of the tongue 75 with the end of slot 74 and by the opposing action of a second pair of these cups.

Forwardly of the carrier 65 are the second cooperating cups 79 and 80, the preloaded coil spring 81 acting to urge cup 80 along the shaft portion 66 away from the cup 79, the latter being held against sliding by engagement with the enlarged shaft portion 67. The cups 79 and 80 are similarly constructed with the aforesaid corresponding cups 73 and 77, the preloaded springs 78 and 81 acting in opposition to each other to yieldingly urge the carrier 65 and cam E in a position equally spaced between the cups 79 and 73.

I will next describe the manual controlling means adapted for operation by the vehicle driver for selectively adjusting the actuating cam E slidably along the splined shaft 56. Referring now to Fig. 1 this manually controlled selector means comprises a stationary selector segment 85 conveniently positioned for access by the vehicle driver. Thus, the selector segment may be suitably clamped by a bracket 86 to the usual steering post 87 carrying the vehicle steering wheel 88, the selector segment 85 pivotally supporting a selector arm or lever 89 by a pivot 90. Connected to the selector arm is a suitable linkage such as a Bowden wire mechanism 91 which extends for connection at 92 with the adjustable shaft 67.

In Figs. 1 and 2 it will be noted that the selector segment 85 is provided with an arcuate flange 93, the flange being provided with a series of arcuately spaced stops or notches 94, 95, 96, 97 and 98 adapted to selectively receive the selector arm 89, the selector arm having a slight springing movement to permit this adjustment and also to yieldingly hold the selector arm in engagement with desired notch against accidental displacement therefrom. The aforesaid notches in the order mentioned and when engaged by the selector arm 89 are adapted to manipulate the transmission C into its speed ratio settings respectively for first or low speed, second speed, third speed, reverse, and neutral.

By reason of the selector mechanism illustrated in Fig. 7 it is possible to selectively adjust the shaft 67 so as to yieldingly urge the cam E to a corresponding position of adjustment but in advance of adjusting movement of the cam. Thus, in Figs. 1, 2 and 7 the selector arm 89 is illustrated in its position of engagement with the first speed notch 94 and when the selector arm is adjusted to another position, one of the springs 78, 81 may be further compressed depending on the direction of movement of shaft 67.

Let it be presumed that the selector arm 89 is adjusted from engagement with the first speed notch 94 to a further position of adjustment in engagement with the second speed notch 95. This movement of the selector arm will act through the Bowden wire mechanism 91 to move the shaft 67 forwardly. In the illustrated embodiment of my invention, the changes in the transmission speed ratio are not in all instances adapted to automatically respond to movement of the selector arm 89, as when the transmission is operated perselectively, the actuating cam E being held in any of its positions of selective adjustment until the motor vehicle operator actuates a further manually controlled means as will be presently apparent. However, this further manually controlled means is so arranged that, when desired, it may be left in a normal position. In such instance the speed ratio changes automatically respond to selective movements of selector arm 89. My description is for the most part directed to that operation of the mechanism which produces preselective control on the speed ratio changes.

Therefore, in the assumed illustration, when the selector arm is moved from the first speed notch 94 into engagement with the second speed notch 95, the cam E will not thereby respond to the forward adjustment of shaft 67. This movement of shaft 67 serves to additionally load spring 78 causing the inner cup 77 to urge carrier 65 together with lever 63 and cam E forwardly as viewed in Fig. 7, the initial compression on spring 81 being materially relieved so that when the resistance to movement of cam E is relieved, carrier 65 and cam E will be moved forwardly until the spring 78 and 81 are balanced, with the carrier 65 again positioned equally between the outer cups 79 and 73. In this manner the cam E is adjusted an amount corresponding to movement of the shaft 67, the latter shaft being moved an amount corresponding to the adjustment of the selector arm 89. Similarly, when the shaft 67 is adjusted rearwardly by reason of a clockwise movement of the selector arm 89 as viewed in Fig. 1, the spring 81 is compressed and the spring 78 is relieved to urge the cam E rearwardly an amount corresponding to the movement of the shaft 67. When either of the springs 78 or 81 is additionally compressed as aforesaid, the cam E being normally in engagement with a pair of brake actuating levers, the carrier 65 is maintained substantially motionless. However, when the brake actuating levers are released by rotation of the cam away from engagement therewith, the carrier 65 then immediately responds to one of the springs 78 or 81 and the inclined faces 56 and 57 of the openings of brackets 50 and 51 will insure proper alignment of cam E with the pairs of brake actuating levers to be engaged with the cam.

I will next describe that part of the power operating means which operates to move the actuating cam E in its operation for selectively engaging the various transmission speed ratio controlling devices 14, 15, 16 and 17. This power moving means, in the present embodiment of my invention, comprises a relatively strong spring 99 best seen in Fig. 4, this spring extending across the transmission casing at the forward end thereof and having a fixed abutment against the rear wall of the casing by a spring retaining cup 100. The spring surrounds an operating shaft 101 to which is secured a second cup 102 against which the other end of the spring 99 is adapted to act. The rod 101 is pivotally connected at 132 to the downwardly extending end of the aforesaid lever 60, it being apparent that the spring 99 acts to rotate the splined shaft 56 and cam E in a counterclockwise direction as viewed in Fig. 3.

The cam E preferably has a toggle-like action produced by the opposite cam faces 103 and 104 shown in Fig. 3, these cam faces being simultaneously engageable with the rollers 43 carried by the outwardly extending pairs of brake actuating levers, such as the levers 39 and 40 of the controlling device 14 illustrated in Fig. 3. It will thus be apparent that when the cam E is rotated, a relatively small amount of travel of the cam is required to produce the desired relatively great pressure acting to contract the band 18. When the cam E is in its fully operated position, the cam faces 103 and 104 are preferably so designed that they may further act a slight amount in separating the engaged rollers 43 in order to actuate the clearance take-up device D as will be presently apparent.

In operation of the foregoing power moving means, it will be apparent that when the slidably adjustable cam E is positioned under control of the manually operated selector mechanism for engagement with any of the aforesaid pairs of lever rollers 43, the spring 99 under control as will be presently apparent, will act to move the cam operating shaft 56 in a counterclockwise direction as viewed in Fig. 3, thereby causing the cam to engage one of the transmission controlling devices. It will furthermore be apparent that when the spring 99 is operating as aforesaid to engage one of the controlling devices, the cam E will not respond to selective adjustment by manipulation of the selector arm 89 without first relieving the spring 99. In other words, the cam E cannot be moved until the pressure of spring 99 is relieved to permit the cam to move to the release position thereof illustrated in Fig. 3.

I will next describe the construction and operation of that part of the power operating means which operates to actuate cam E and shaft 56 for releasing the spring 99 and thus for releasing the various transmission speed ratio controlling devices 14, 15, 16 and 17. This part of the power operating means comprises a fluid pressure operating means or power actuating means best shown in Fig. 5. Referring particularly to Figs. 4, 5 and 7, the shaft 67 is provided with a series of spaced notches 105, 106, 107, 108 and 109 adapted respectively to engage a roller 110 of one end of a follower rod 111 when the selector arm 89 is engaged with the notches 94, 95, 96, 97 and 98. The rod 111 reciprocates in suitable guides 112 and 113 when tripped by the cams of shaft 67, the cams being formed by reason of the aforesaid notches in shaft 67.

The rod 111 has its outer end provided with a clevis pin bracket 114 adjustable by a nut 115, this bracket carrying pin 116 which thereby pivots one end of a lever 117 fulcrumed intermediate its ends by a bracket 118. The other end of the lever has a yoke engaging a collar 119 sliable along the outwardly extending end of the valve 120.

The collar 119 yieldingly urges the valve 120 inwardly and outwardly by the opposed preloaded springs 121 and 122 respectively acting on retaining cups 123 and 124 fixed to valve 120. Surrounding rod 111 is a spring 125 abutting the guide 113 and acting on a collar 126 fixed to the rod.

The valve 120 is slidably mounted in an opening 127 of the casting 128, this casting being secured to the outer end of a fluid pressure operating cylinder 129, the cylinder in turn being of suitable size and capacity and appropriately secured to the side of the transmission casing. The valve 120 has an end projecting inwardly into the cylinder 129 for contact with the piston 130 which operates within the cylinder. The piston carries an inwardly extending piston rod 131 which operates through the transmission casing for pivotal connection at 132ª with the aforesaid spring actuated rod 101.

In the present embodiment of my invention the cylinder 129 is adapted to be placed in communication with the vacuum produced by the intake system of engine A and to this end the casting 128, as best seen in Fig. 4, is provided with a passage 133 open to cylinder 129, this passage being in communication with a conduit 133ᵃ when the valve 120 is positioned as shown in Figs. 4 and 5. Thus, the passage 133 extends transversely of the valve guide 127 and the valve has a reduced portion 134 adapted to register with the passage 133 to establish the aforesaid communication between this passage and conduit 133ᵃ. When the valve 120 is moved outwardly, the communication between passage 133 and conduit 130 will be interrupted, the reduced valve portion 134 in such instance being adapted to vent the cylinder 129 by establishing communication between passages 135 and 136, the latter passage communicating with the aforesaid passage 133.

In order to yieldingly hold the valve 120 in its inward position of movement, the valve is provided with a notch 137 engageable by a plunger detent 137ᵃ yieldingly urged by a spring 137ᵇ toward the valve, the tension of this spring being adjustably controlled by a screw 137ᶜ. When the detent 137ᵃ engages the notch 137, the valve 120 is positioned as shown in Figs. 4 and 5 and when the valve 120 is moved outwardly the detent 137ᵃ will engage the valve 120, the reduced portion 134 of the valve being then positioned to vent the cylinder 129 by establishing communication between passages 135 and 136.

In order to yieldingly cushion the outward movement of piston 130, the cylinder 129 may be provided with the rubber bumpers 137ᵈ, it being understood that before piston 130 strikes these bumpers the notch 137 will be moved outwardly free from engagement with the detent 137ᵃ.

In order to manually control the supply of vacuum between the engine A and the conduit 133ᵃ, so that the system may be operated preselectively or in direct response to movement of selector arm 89, I have provided an appropriate mechanism illustrated in Fig. 1. The engine A has the usual intake manifold 138 supplied with fuel mixture from a carburetor 139, the usual throttle valve 140 being adjustable by a lever 141 adapted for actuation by the accelerator pedal 142 pivotally mounted at 143 to the usual toe board 144 of the vehicle. The conduit 133ᵃ communicates through a valve 145 of any suitable construction with the manifold 138, the valve being operated through a lever 146 pivotally connected at 147 to a link 148 which extends rearwardly through the toe board 144 for pivotal connection at 149 with the accelerator pedal 142. Interconnecting the levers 141 and 146 is a link 150 pivotally connected at 151 with the aforesaid lever 146 and likewise pivotally connected at 152 with the lever 141. A spring 153 serves to yieldingly urge the accelerator pedal 142 into the position illustrated in Fig. 1. In such position the throttle valve 140 is closed to produce a relatively high vacuum in the manifold 138 and simultaneously therewith the valve 145 is opened to place the conduit 133ᵃ in communication with manifold 138. Whenever the operator depresses the accelerator pedal 142 to open the throttle valve 140, the valve 145 will be actuated through lever 146 to close communication between the conduit 133ᵃ and the manifold 138.

In operation of the power actuating means, Figs. 4 and 5 illustrate the position of the parts during the power stroke of piston 130 under the influence of the engine vacuum established in cylinder 129 by a release condition of the accelerator pedal 142 as shown in Fig. 1. The valve 120 is positioned as shown in Figs. 4 and 5 and piston 130 is moving outwardly and is just contacting with the inwardly extending end of valve 120. Further outward movement of the piston will actuate the valve 120 outwardly to move the notch 137 beyond the detent 137ᵃ. Once the notch is thus clear of the detent, the spring 122, as will presently be more apparent, acts to continue the outward movement of valve 120 independently of the piston movement. The reduced valve portion 134 is thereby moved to close communication between conduit 133ᵃ and conduit 133 and to vent the cylinder 129 by establishing communication between the passages 133, 136 and 135. The cylinder 129 has a vent 137ᵉ at its inner end.

During this outward movement of the piston 130, the spring 99 will be compressed to release the cam E from engagement with a pair of the rollers 43, the cam E at this time slidably accommodating itself on shaft 56 to a preselected adjustment of the shaft 67 as aforesaid. As soon as the piston 130 has moved outwardly to vent the cylinder 129, the spring 99 is then free to act to move the piston 130 inwardly and to also rotate the shaft 59 in the opposite direction to rotate the cam E counterclockwise as viewed in Fig. 3 and thereby actuate one of the speed ratio controlling devices according to the new position of the cam.

With the cam in such position of actuation, let it be presumed that the vehicle driver manipulates the selector arm 89 into a new position of control with the accelerator pedal depressed. The selector shaft 67 will be adjusted but the cam E will remain fixed on the operating shaft 56 until the vehicle driver releases the accelerator pedal 142.

When the selector arm was adjusted as aforesaid it will be apparent that the shaft 67 will be reciprocated to move the rod 111 outwardly by reason of the roller 110 following the contour of shaft 67. This outward movement of rod 111 acts through the lever 117 to move the collar 119 inwardly and the preloaded balanced springs 121, 122 thereby cause valve 120 to follow the collar movement to engage notch 137 with detent 137ᵃ. The roller 110 then drops into the next of the series of notches engageable therewith, the spring 125 causing rod 11 to move inwardly as the roller engages the notch but spring 137ᵇ and detent 137ᵃ are of sufficient strength to hold valve 120.

Spring 125 is proportioned to force the collar 119 outwardly along the valve 120 thereby compressing spring 122 and relieving spring 121, this being the condition of the parts as shown in Figs. 4 and 5. Therefore, each time a selection is made with the selector arm 89, the cylinder 129 is placed in communication with the vacuum supply passage 133ᵃ and the spring 122 is loaded ready to move valve 120 to its venting position just as soon as the piston 130 moves outwardly in releasing the cam E from an engaged position of actuation of one of the speed ratio controlling devices.

In the event that the selector arm 89 should be accidentally moved to trip the rod 111 when the piston is at its outer limit of travel, at which time the valve 120 cannot be moved inwardly to engage the notch and detent, the spring 121 will yield to prevent any binding or breaking of the mechanism as will be readily apparent.

The valve 120 therefore establishes communication between cylinder 129 and the vacuum conduit 133 and, on release of the accelerator pedal 142, the valve 145 will be opened so as to establish communication between the conduit 133ª and the manifold 138. This will produce a vacuum in the cylinder 129 causing piston 130 to move outwardly to release the operating shaft 56 and cam E in repeating the cycle.

It will be obvious that, instead of adjusting arm 89 with pedal 142 depressed, such adjustments of arm 89 may be made with pedal 142 in its normal released Fig. 1 position with the vehicle driving the engine. In such instances valve 120 will open cylinder 129 to the vacuum in manifold 138 in direct response to manipulation of arm 89, the parts otherwise operating as when the arm 89 is moved with the pedal 142 depressed.

Before describing the construction and operation of the clearance take-up device D, I will briefly review the power transmission mechanism as a whole. Let it be presumed that the transmission is in its first speed setting and that the vehicle driver has just manipulated the selector arm 89 from engagement with the neutral notch 98 to the first speed notch 99 of the selector segment 85. In order to describe a complete cycle it is therefore desirable to consider the position of the parts with the transmission in neutral and with the selector arm 89 in engagement with the neutral notch 98. In such position the cam E will be adjusted so as to align with the openings 54 and 55 of the brackets 50 and 51 respectively, it being apparent that rotation of the splined shaft 56 in a counterclockwise direction as viewed in Fig. 3 under the influence of the spring 99 will not actuate any of the transmission controlling devices 14, 15, 16 or 17 inasmuch as the openings 54 and 55 do not have any operating levers associated therewith.

With the operator moves the selector arm 89 from notch 98 into notch 94, with pedal 142 depressed, the shaft 67 will be adjusted forwardly causing the roller 110 to follow the contour of shaft 67 in moving from notch 109 to notch 105. This movement of roller 110 causes a reciprocation of the rod 111 which moves the valve 120 from its position for venting the cylinder 129 into the Fig. 5 position for establishing communication between cylinder 129 and the vacuum supply conduit 133ª.

At the same time that the rod 111 is reciprocated as aforesaid, the forward adjustment of shaft 67 places the spring 78 under an additional compression, the spring 81 having a portion of its initial compression relieved, the carrier 65 being thereby yieldingly urged forwardly and tending to move the cam E into position for engaging the rollers 43 of the first speed brake actuating levers 39 and 40. The cam E is prevented from moving however until it is rotated sufficiently to clear the bracket portions between the pairs of openings 54, 55 and 52, 53.

The mechanism is now set ready for the change to actually take place in the transmission, this change being produced when the driver releases the accelerator pedal 142. Such release opens the valve 145 and closes the throttle valve 140, the resulting vacuum in the manifold 138 being transmitted to cylinder 129 to cause the piston 130 to move outwardly and thereby retract spring 99 and to also rotate cam E into its released position. In Figs. 3, 4 and 5 the parts are shown toward the completion of the cycle just described wherein the cam E is ready for actuating the first speed levers 39 and 40, the cam having been rotated into its inoperative position during movement of the piston 130. The outward movement of piston 130 under the influence of the vacuum will actuate valve 120 to again vent the cylinder whereupon spring 99 will rotate the cam E in a counterclockwise direction as viewed in Fig. 3 this movement separating the rollers 43 carried by levers 39 and 40 to contract the first speed band 18 and arrest rotation of drum 19. Obviously, with the transmission in neutral, the pedal 142 may be left released to idle the engine and arm 89 moved from notch 98 into notch 94 to effect the cycle of operation of piston 130 and to position cam E for operating the first speed levers 39 and 40. In either instance, the transmission is then in the first speed ratio and the operator depresses the accelerator pedal 142 to cause the engine A to drive the motor vehicle in the forward direction. He again actuates the selector arm 89 into a new setting. Thus, for example, let it be presumed that it is desired to preselectively manipulate the transmission from the aforesaid first speed setting into the second speed setting. The selector arm 89 will accordingly be moved from engagement with notch 94 into engagement with notch 95. This movement will be accompanied by further forward movement of shaft 67 so as to again yieldingly urge the carrier 65 forwardly and to also actuate the valve 118 from its vented position into the position shown in Fig. 5 for establishing communication between cylinder 129 and the vacuum conduit 133ª.

Just as soon as the vehicle driver releases the accelerator pedal 142, the valve 145 will be opened to admit the vacuum to cylinder 129. The piston 130 will respond to release the cam E from engagement with the first speed levers 39 and 40 whereupon the carrier 65 will immediately move forwardly under the action of spring 78 to a position of alignment with the second speed actuating levers 39ª ad 40ª. The first speed controlling device 14 is thereby released and the second speed controlling device 14 is thus in position for actuation. Rearward movement of the piston 130 toward the end of its stroke actuates the valve 120 into its vented position whereupon the spring 99 will act to rotate the shaft 56 in the opposite direction causing a spreading of the second speed levers under the influence of the cam E. Alternatively, arm 89 may be shifted from notch 94 into notch 95 with pedal 142 released to dispense with the preselective operation. In either instance the transmission is thus caused to drive the vehicle in the second speed ratio.

From the foregoing description of a complete cycle of gear ratio change, it will be apparent that the transmission may be manipulated into its third speed setting by adjustment of the selector arm 89 into engagement with the notch 96 followed by the release of the accelerator pedal 142 unless the pedal was released prior to adjustment of arm 89. It will furthermore be apparent that it is not necessary for the vehicle operator to adjust the selector arm 89 successively into engagement with the next adjacent notches of the selector segment. For example, the selector arm 89 may be moved directly from engagement with the neutral notch 98 into engagement with the third speed notch 96 causing acceleration of the vehicle in its third speed ratio. Likewise with the transmission set in any of its forward driving speeds, a lesser gear ratio may be obtained by moving the selector arm in a clockwise direction as viewed in Fig. 1.

When it is desired to operate the motor vehicle in reverse, the selector arm 89 is moved into engagement with the reverse notch 97 and the accelerator pedal 142 is momentarily released, in the event that it was depressed during adjustment of arm 89, to cause operation of the reverse controlling device 17 in a manner similar to the operation of the other controlling devices.

By providing a clutch B of the fluid type it will be apparent that the motor vehicle may be brought to rest by the application of the usual wheel brakes with the transmission set in one of its driving speed ratios, the fluid medium permitting the clutch to slip when the accelerator pedal is released to idle the engine A. This has the advantage of permitting acceleration of the motor vehicle merely by depressing the accelerator pedal to open the engine throttle, the vehicle being accelerated in the same gear ratio setting which was provided during the time when the vehicle was at rest. Obviously, other forms of clutches may be provided if desired and it is not my intention to limit my invention to the provision of a clutch of the fluid type.

I will next describe my improved brake shoe clearance take-up mechanism D best illustrated in Figs. 3, 8, 9 and 10, it being understood that one of these mechanisms is preferably arranged in association with each pair of actuating levers for each of the speed ratio controlling devices 14, 15, 16 and 17. In Figs. 3, 8, 9 and 10 I have illustrated one of these mechanisms D in detail and the following description of this mechanism in association with the levers 39 and 40 of the first speed controlling device 14 will serve to illustrate the corresponding take-up devices in association with each of the controlling devices.

The oppositely threaded shafts 45 and 46 engage corresponding threads of a hub 154, this hub being provided with a circumferential series of axially extending openings 155 adapted to closely receive the respective coil springs 156. Surrounding the portion of hub 154 which is provided with the aforesaid openings 155 is an adjusting casing 157 provided with an outwardly extending lever arm 158. This lever projects into an opening 159 of a bracket 160 depending from the lever 39. The bracket carries an adjustable abutment 161 having a conical cam face 162 positioned to lie in the path of movement of the lever 158. The bracket 160 is provided with a cam face 163 which cooperates with the cam 162 to oscillate the lever 158 as follows.

When the brake band 18 is initially installed to provide a predetermined relatively small amount of clearance with the drum 19, the cam 162 barely contacts with lever 158 when the actuating levers 39 and 40 are separated by operation of the cam E. Under such conditions the lever 158 merely reciprocates without oscillatory movement as the levers 39 and 30 are successively brought together and moved apart. In the event that excessive clearance should develop between the brake band and drum 19 as might be occasioned by wear of the lining 20, it will be apparent that the cam E will rotate slightly more in applying the brake in order to take up the excess clearance. When the cam E is thus actuated it will be apparent that the bracket 160 will be raised relative to lever 158 somewhat farther than will ordinarily be the case, the lever 158 engaging the cam 162 and moving along this cam to swing lever 158 laterally, the lever then lying below the cam face 163.

During such lateral movement of the lever 158 the casing 157 will slightly rotate slipping on the springs 156 by reason of the fact that hub 154 is held by the braking forces applied to shafts 45 and 46 at the lever fulcrums 37 and 38 respectively.

When the cam E is released so that the band 18 is expanded, the bracket 160 is moved downwardly causing lever 158 to strike the cam face 163 and thereby oscillate the housing 157 in the opposite direction, the lever 158 again entering the opening 159 to the original position. This return rotation of housing 157 carries with it the hub 154 by reason of the friction established by springs 156. Rotation of hub 154 causes the shafts 45 and 46 to move toward each other thereby bringing the fulcrums 37 and 38 closer together an amount sufficient to take up the excessive clearance between the brake band and the drum. The casing 157 is operably connected with the hub 154 during the releasing action of the brake inasmuch as the braking force is then relieved from the levers 39 and 40 and from the shafts 45 and 46, the friction exerted by springs 156 under such conditions being sufficient to cause the casing and hub to rotate as a unit. It will thus be apparent that the mechanism illustrated in Figs. 8, 9 and 10 operates as a slipping clutch controlled by the friction of springs 156 and the resistance to relative rotation between hub 154 and the threaded shafts 45 and 46.

It will be apparent that the clearance will be taken up in very small increments as it develops during operation of the braking device. The parts of the friction take-up device relatively slip during the brake applying action whenever clearance is to be taken up, these parts being frictionally connected together so as to rotate as a unit during the brake releasing action. It will furthermore be noted that by reason of my having provided a separate clearance take-up mechanism D associated with each of the speed ratio brake controlling devices, I am enabled to maintain the desired amount of clearance for each braking device independently of each other, according to the usage of the mechanism and the amount of wear which might be experienced in one or more of the brake controlling devices more than in others.

Various modifications and changes will be readily apparent from the teachings of my invention, as set forth in the appended claims, and it is not my intention to limit my invention to the particular details of construction and operation shown and described for illustrative purposes.

What I claim is:

1. In a motor vehicle transmission having a plurality of speed ratio controlling devices, means operably associated with each of said controlling devices for actuating said devices, a slidably adjustable operating element adapted for selective operative connection with said actuating means for said controlling devices, manually operated means for yieldingly urging said operating element selectively to its positions of sliding adjustment in advance of adjusting sliding movement thereof, power operating means for alternately actuating and releasing said operating element, and means acting to hold said operating element against selective sliding movement during actuation and prior to release of said operating element.

2. In a motor vehicle transmission having a plurality of speed ratio controlling devices, power operating means for selectively operating said controlling devices, an adjustable cam adapted to selectively establish an operating connection between said power operating means and said controlling devices, and manually actuated means for yieldingly urging said cam selectively to its positions of adjustment in advance of adjusting movement thereof.

3. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, means including an adjustable cam adapted for selective operative connection with said actuating means, manually operated means for yieldingly urging said cam selectively to its positions of adjustment in advance of adjusting movement thereof, and power operating means for alternately actuating and releasing said cam.

4. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, an adjustable operating cam adapted for selective operative connection with said actuating means, manually operated means including mechanism for selectively adjusting said operating cam, and power operating means controlled by said manual means for actuating said operating cam.

5. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, an adjustable operating cam adapted for selective operative connection with said actuating means, manually operated means for yieldingly urging said operating cam selectively to its positions of adjustment in advance of adjusting movement thereof, and power operating means for alternately actuating and releasing said operating cam.

6. In a motor vehicle planetary transmission having a plurality of speed ratio planetary gear trains and rotary controlling elements associated therewith, braking means for resisting rotation of each of said elements, means operably associated with each of said braking means and adapted to actuate the respective braking means, a selector operating member adjustable to provide selective operative connections respectively with said actuating means for said braking means, means for mounting said selector operating member for reciprocating movement along and rotative movement about a common axis, a manually operable selector element movable to a plurality of stations of transmission control, power operating means for imparting one of said movements to said selector operating member for operating said selector operating member in its positions of selective adjustment, means operating in response to manual movement of said selector element from one of said stations to another for imparting the other of said movements to said selector operating member to selectively adjust said selector operating member, and means operating in response to manual adjustment of said selector operating element from one of said stations to another for exercising a control on the operation of said power operating means.

7. In a motor vehicle planetary transmission having a plurality of speed ratio planetary gear trains and rotary controlling drums associated therewith, braking means for resisting rotation of each of said drums, a pair of levers for each of said braking means, means for pivoting said levers, the levers of each pair having one end thereof operably connected to its associated braking means and adapted when actuated to operate the braking means associated therewith, an adjustable actuating cam for selectively actuating the other ends of each of said pairs of levers, power operating means for actuating said cam, a manually shiftable selector element, and means operating in response to manual shifting of said selector element for selectively adjusting said cam and for controlling the operation of said power operating means.

8. In a motor vehicle planetary transmission having a speed ratio planetary gear train and rotary controlling drum associated therewith, braking means for resisting rotation of said drum, means including a lever adapted to actuate said braking means, means for actuating said lever, and means responsive to abnormal actuation of said lever for moving the lever fulcrum whereby to substantially maintain a predetermined clearance between said drum and braking means when said braking means is released.

9. In a motor vehicle planetary transmission having a speed ratio planetary gear train and rotary controlling drum associated therewith, braking means for resisting rotation of said drum, a pair of levers adapted when actuated to operate said braking means, adjustable means connecting the fulcrums of said levers adapted to relatively shift said fulcrums in response to abnormal actuation of said levers whereby to substantially maintain a predetermined clearance between said drum and braking means when the latter is inoperative, and means for actuating said levers.

10. In an engine driven vehicle power transmission having a plurality of speed ratio controlling devices adapted for selective operation to vary the speed ratio drive through the transmission, means operated by the vacuum produced by said engine for releasing said controlling devices, spring actuated means adapted to operate said controlling devices, manually controlled selector means for selectively controlling operation of said controlling devices by said spring actuated means, valve means controlling the supply of vacuum from said engine to said vacuum operated means, and an operating connection between said manually controlled means and said valve means, said manually controlled means including an adjustable operating element adapted to selectively provide an operating connection between said spring actuated means and said controlling devices.

11. In a motor vehicle transmission having a plurality of speed ratio controlling devices, means operably associated with each of said controlling devices for actuating said devices, an adjustable operating cam adapted for selectively adjustable operable connection with said actuating means for said controlling devices, manually controlled selector means adapted to exercise a selecting influence on said operating cam in advance of selective adjustment thereof, and manually controlled means for operating said cam under power in its positions of selective adjustment, said manually controlled selector means acting to selectively adjust said operating cam in response to release of said operating cam from the operating force of said power operating means.

12. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating cam adapted for selectively adjustable operable connection with said actuating means for said braking means, manually controlled selector means adapted to exercise a selecting influence on said operating cam in advance of selective adjustment thereof, and power means for operating said cam in its positions of selective adjustment for transmitting braking force therethrough, said manually controlled selector means acting to selectively adjust said operating cam in response to release of said operating cam from the brake operating force of said power means.

13. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating cam adapted to apply braking force in positions of selective adjustment thereof to said actuating means for said braking means, manually controlled means for selectively adjusting said operating cam, and power means for operating said cam in its said positions of selective adjustment in successive movements for alternately applying and releasing braking force at said braking means, said power operating means including fluid pressure operating means adapted to operate said cam for at least one of its said successive movements.

14. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating cam adapted to apply braking force in positions of selective adjustment thereof to said actuating means for said braking means, manually controlled means for selectively adjusting said operating cam, and power means for operating said cam in its said positions of selective adjustment in successive movements for alternately applying and releasing braking force at said braking means, said power operating means including fluid pressure operating means adapted to operate said cam in said movement of braking force release.

15. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating cam adapted to apply braking force in positions of selective adjustment thereof to said actuating means for said braking means, manually controlled means for selectively adjusting said operating cam, and power means for operating said cam in its said positions of selective adjustment in successive movements for alternately applying and releasing braking force at said braking means, said power operating means including fluid pressure operating means adapted to operate said cam for one of said successive movements and a spring adapted to operate said cam for the other of said successive movements.

16. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selective operating means including a selector operating member adapted for selective operating connection with said braking devices, fluid pressure operating means operably connected to said selector operating means for actuating said selector operating member, valve means controlling the supply of fluid pressure to said fluid pressure operating means, a manually adjustable selector element, means operably connecting said manually adjustable selector element with said selector operating member for adjusting said member, means including a follower member operably connected to actate said valve means, and an element having a series of cams carried thereby and adapted for movement in response to manual adjustment of said selector element, said follower being positioned for actuation by said cams.

17. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selector operating means adapted for selective operating connection with said braking devices, fluid pressure operating means operably connected to said selector operating means, valve means controlling the supply fluid pressure to said fluid pressure operating means, a manually adjustable selector element, means operably connecting said manually adjustable selector element with said selector operating means, an element having a series of cam-like portions and adapted for movement in response to manual adjustment of said selector element, a follower selectively operated by said cams, and means providing a yieldable operating connection between said follower and said valve means.

18. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selective operating means adapted for selective operating connection with said braking devices, fluid pressure operating means operably connected to said selector operating means, valve means controlling the supply of fluid pressure to said fluid pressure operating means, a manually adjustable selector element, means operably connecting said manually adjustable selector element with said selector operating means, means including a follower member operably connected to actuate said valve means, an element having a series of cams carried thereby and adapted for movement in response to manual adjustment of said selector element, said follower being positioned for actuation by said cams, and a spring opposing the operation of said selector operating means by said fluid pressure operating means.

19. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selector operating means including a selector operating member adapted for selective operating connection with said braking devices, fluid pressure operating means operably connected to said selector operating means for actuating said selector operating member, valve means controlling the supply of fluid pressure to said fluid pressure operating means, a manually adjustable selector element, means operably connecting said manually adjustable selector element with said selector operating member for adjusting said member, a cam member provided with a series of cams corresponding to positions of and adapted for movement in response to manual adjustment of said selector element, a follower adapted to be actuated by said cams in response to movement of said cam member, and means providing an operating connection between said follower and said valve means.

20. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selector operating means adapted for selective operating connection with said braking devices, fluid pressure operating means operably connected to said selector operating means, valve means controlling the supply of fluid pressure to said fluid pressure operating means, a manually adjustable selector element, means operably connecting said manually adjustable selector element with said selector operating means, means for actuating said valve means in response to manual adjustment of said selector element, and additional manually operable valve means for controlling the supply of fluid pressure to the first said valve means.

21. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selector operating means adapted for selective operating connection with said braking devices, fluid pressure operating means operably connected to said selector operating means, valve means controlling the supply of fluid pressure to said fluid pressure operating means, a manually adjustable selector element, means operably connecting said manually adjustable selector element with said selector operating means, means for actuating said valve means in response to manual adjustment of said selector element, and engine throttle valve operated means for controlling the supply of fluid pressure to the first said valve means.

22. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, power means for operating said braking devices including a selectively adjustable operating member, said operating means further including a cylinder and piston assembly, manually operable speed ratio controlling means including adjusting means for selectively operably connecting said operating member with said braking devices, valve controlling means operable by said manual means for subjecting said cylinder to fluid pressure whereby to move said piston in one of its directions of reciprocation, and means for operating said valve controlling means and including a cam carrying member adapted for actuation by said manual means and a cam follower member adapted to operate said valve controlling means.

23. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, means for operating said braking devices including a selectively adjusting operating member, said operating means further including a cylinder and piston assembly, manually operable speed ratio controlling means including adjusting means for selectively operably connecting said operating member with said braking devices, valve controlling means operable by said manual means for subjecting said cylinder to fluid pressure whereby to move said piston in one of its directions of reciprocation, means for operating said valve controlling means and including a cam carrying member adapted for actuation by said manual means and a cam follower member adapted to operate said valve controlling means, and means responsive to movement of said piston in said direction for relieving said cylinder of said fluid pressure.

24. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, means for operating said braking devices including a selectively adjustable operating member, said operating means further including a cylinder and piston assembly, manually operable speed ratio controlling means including adjusting means for selectively operably connecting said operating member with said braking devices, valve controlling means operable by said manual means for subjecting said cylinder to fluid pressure whereby to move said piston in one of its directions of reciprocation, means for operating said valve controlling means and including a cam carrying member adapted for actuation by said manual means and a cam follower member adapted to operate said valve controlling means, means responsive to movement of said piston in said direction for relieving said cylinder of said fluid pressure, and a spring acting on said piston for moving said piston in the other of its said directions of reciprocation in response to said fluid pressure relief in said cylinder.

25. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, means including a plurality of actuating levers respectively operably connected to said braking devices, means for mounting said levers adjacent said braking devices, said levers extending outwardly from said braking devices and being inclined relatively toward one another and presenting substantially aligned end portions, and manually controlled power operating means for selectively operating the end portions of said levers.

26. In a motor vehicle transmission having a plurality of speed ratio controlling braking devices, a pair of force multiplying members operably associated with each of said braking devices for actuating said braking devices, an adjustable operating element adapted for selective operative connection with and between said force multiplying members of each pair, means for selectively adjusting said operating element, power operating means for actuating said operating element, and a selector element manually shiftable between a plurality of stations of transmission control for operating said adjusting means and for controlling the operation of said power operating means.

27. In a motor vehicle planetary gear transmission having a plurality of speed ratio planetary gear trains and rotary controlling elements associated therewith, means engageable with each of said rotary elements for controlling rotation thereof, actuating means operably associated with each of said engageable means, a common rotatable and adjustable selector operating member adapted for selective operative engagement with said actuating means, mechanism for selectively adjusting said common member longitudinally of its axis of rotation, power operating means for rotatably actuating said common member, and a selector element manually shiftable between a plurality of stations of transmission control for operating said adjusting mechanism and for controlling the operation of said power operating means.

28. In a motor vehicle planetary gear transmission having a plurality of speed ratio planetary gear trains and rotary controlling elements associated therewith, means engageable with each of said rotary elements for controlling rotation thereof, actuating means operably associated with each of said engageable means, a common adjustable selector operating member adapted for selective operative engagement with said actuating means, manually operated means including mechanism for selectively adjusting said common member, fluid pressure operating means for actuating said common member, valving means controlling fluid pressure operation of said fluid pressure operating means, and means for causing operation of said valve means in response to operation of said manual means.

29. In a motor vehicle planetary gear transmission having a plurality of speed ratio planetary gear trains and rotary controlling elements associated therewith, means engageable with each of said rotary elements for controlling rotation thereof, actuating means operably associated with each of said engageable means, a common adjustable selector operating member adapted for selective operative engagement with said actuating means, manually operated means including mechanism for selectively adjusting said common member, a fluid pressure operated piston for actuating said common member in one direction of movement of said piston and member, a spring for returning said piston and common member, valving means controlling fluid pressure supply to said piston, and means for operating said valving means in response to operation of said manual means.

30. In a motor vehicle planetary gear transmission having a plurality of speed ratio planetary gear trains and rotary controlling elements associated therewith, means engageable with each of said rotary elements for controlling rotation thereof, actuating means operably associated with each of said engageable means, a common adjustable selector operating member adapted for selective operative engagement with said actuating means, manually operated means including mechanism for selectively adjusting said common member, said manually operated means further including an adjustable selector element adapted for selective movement to a plurality of predetermined stations of transmission control, and power operating means controlled by said movement of said selector element for actuating said common member.

31. In a motor vehicle planetary gear transmission having a plurality of speed ratio planetary gear trains and rotary controlling elements associated therewith, means engageable with each of said rotary elements for controlling rotation thereof, actuating means operably asscociated with each of said engageable means, a common adjustable selector operating member adapted for selective operative engagement with said actuating means, manually operated means including mechanism for selectively adjusting said common member, said manually operated means further including an adjustable selector element adapted for selective movement to a plurality of predetermined stations of transmission control, fluid pressure operating means for actuating said common member, valving means controlling fluid pressure operation of said fluid pressure operating means, and means for causing operation of said valving means in responsive to said movement of said selector element.

32. In a motor vehicle transmission having a plurality of speed ratio controlling devices, means operably associated with each of said controlling devices for actuating said devices, an adjustable operating element adapted for selective operative connection with said actuating means for said controlling devices, fluid pressure operating means for said operating element, manually controlled selector means for controlling said fluid pressure operating means and for adjusting said operating element selectively to its positions of adjustment subsequently to said control of said fluid pressure operating means, and power moving means for moving said operating element in opposition to said fluid pressure operating means.

33. In a motor vehicle transmission having a plurality of speed ratio controlling devices, power operated means for selectively operating said controlling devices, an adjustable element adapted to selectively establish an operating connection between said power operated means and said controlling devices, and manually operated selector means for adjusting said adjustable element selectively to its positions of adjustment subsequently to exercising a control on said power operated means.

34. In a power transmission having a plurality of speed ratio controlling devices, an adjustable selector element adapted for movement between a plurality of stations to control selective operation of said devices, power operating means for selectively operating said devices, an adjustable selector operating member adapted to selectively provide an operating connection between said power operating means and each of said devices, and means responsive to movement of said selector element from one of said stations to another to control said power operating means and to selectively adjust said operating member.

35. In a power transmission having a plurality of speed ratio controlling devices, an adjustable selector element adapted for movement between a plurality of stations to control selective operation of said devices, power operating means for selectively operating said devices, an adjustable selector operating member adapted to selectively provide an operating connection between said power operating means and each of said devices, and means responsive to movement of said selector element from one of said stations to another to selectively adjust said operating member and thereafter effect an operating control on said power operating means.

36. In a power transmission having a plurality of speed ratio controlling devices, an adjustable selector element adapted for movement between a plurality of stations to control selective operation of said devices, power operating means for selectively operating said devices, an adjustable selector operating member adapted to selectively provide an operating connection between said power operating means and each of said devices, and means responsive to movement of said selector element from one of said stations to another to first release operation of said power operating means and then to selectively adjust said operating member and restore operation of said power operating means.

37. In a power transmission of the planetary gear type having a plurality of speed ratio controlling braking devices for selectively establishing variable drives through planetary gear trains, an adjustable selector element adapted for movement between a plurality of stations to control selective operation of said braking devices, power operating means for selectively operating said braking devices, an adjustable selector operating member adapted to selectively provide an operating connection between said power operating means and each of said devices, and means responsive to movement of said selector element from one of said stations to another to control said power operating means and to selectively adjust said operating member.

38. In a motor vehicle transmission having a plurality of spaced ratio controlling devices, power operating means, an operating member adjustable to positions of selective operative connection with said controlling devices and movable by said power operating means in said positions of adjustment to operate a selected controlling device, a controlling element manually adjustable to a plurality of stations of transmission control, and means responsive to manual adjustment of said controlling element for adjustment of said operating member and for exercising a control on said power operating means.

39. In a motor vehicle planetary transmission having a plurality of planetary gear trains and associated rotary control elements, braking means for each of said control elements, power operating means for selectively applying said braking means, an operating member adjustable to positions of selective operative connection with said braking means and movable by said power operating means in said positions of adjustment to transmit braking force to a selected braking means, a controlling element manually adjustable to a plurality of stations of transmission control, and means responsive to manual adjustment of said controlling element for adjusting said operating member and for exercising a control on said power operating means.

40. In a motor vehicle planetary transmission having a plurality of planetary gear trains and associated rotary control elements, braking means for each of said control elements, power moving means for selectively applying said braking means, an operating member adjustable to positions of selective operative connection with said braking means and movable by said power moving means in said positions of adjustment to transmit braking force to a selected braking means, power actuating means adapted to return said operating member after movement thereof by the first said power operating means for releasing a previously applied braking means, a controlling element manually adjustable to a plurality of stations of vehicle driving transmission control, and means responsive to manual adjustment of said controlling element for adjusting said operating member and for controlling the operation of said power moving means and of said power actuating means.

41. In a motor vehicle transmission having a plurality of speed ratio controlling devices, an adjustable selector operating member adapted for power operation in its selectively adjusted positions for selectively controlling operation of said devices, power operating means for said member, a manually actuable element selectively shiftable to a plurality of predetermined stations of transmission control, means responsive to said station shifting of said element for controlling operation of said power operating means, and a yielding operating connection between said element and member for selectively adjusting said member in response to said station shifting of said element, said yielding connection providing for said control of said power operating means in advance of said adjustment of said member when said element is shifted from one of said stations to another.

42. In a motor vehicle transmission having a plurality of gear-train-controlling rotary elements, devices respectively frictionally engageable with said rotary elements, an adjustable selector operating structure adapted for power operation in positions of selective adjustment for selectively engaging said devices, power moving means for moving said selector operating structure to provide and maintain power engagement of said devices selectively with said rotary elements, a selector element manually shiftable between a plurality of stations of transmission control, means responsive to said station shifting of said element for controlling said power moving means to effect release of said selector operating structure and consequent release of any of said devices engaged prior to such station shifting of said element, and a yielding operating connection between said element and said selector operating structure for selectively adjusting said structure in response to said station shifting of said element, said yielding connection providing for said releasing control of said power moving means in advance of said adjustment of said selector operating structure when said element is shifted from one of said stations to another.

43. In a planetary transmission for an engine driven motor vehicle having a throttle-valve-controlling accelerator pedal adapted for manipulation by the vehicle driver; planetary gearing having rotatable control elements driven thereby; a pair of friction devices respectively adapted to engage said control elements to vary the drive through the transmission by effecting a change from a relatively slow forward drive to a relatively fast forward drive; and means for effecting pressure fluid operation of said friction devices, including, a selector element adjustable by the driver from a transmission control station corresponding to said relatively slow drive to a second station corresponding to said relatively fast drive, valving means for controlling a supply of fluid under pressure to operate said friction devices by power, and means operably connecting the accelerator pedal and the selector element with said valving means for joint control of said valving means by this pedal and element such that driver adjustment of the selector element from the first said control station to the second control station will either thereupon effect said pressure fluid supply or provide a presetting influence on the valving means so that said pressure fluid supply will be delayed until the driver manipulates the accelerator pedal.

44. In a planetary transmission for an engine driven motor vehicle having a throttle-valve-controlling accelerator pedal adapted for manipulation by the vehicle driver; planetary gearing having rotatable control elements driven thereby; a pair of friction devices respectively adapted to engage said control elements to vary the drive through the transmission by effecting a change from a relatively slow forward drive to a relatively fast forward drive; a selector element adjustable by the driver from a position of control corresponding to said relatively slow drive to a second position of control corresponding to said relatively fast drive; and means adapted for operation either in response to driver adjustment of the selector element or subsequently to driver adjustment of the selector element and in response to predetermined manipulation of said accelerator pedal for controlling engagement of said friction devices to effect the aforesaid transmission drive change.

HERBERT F. PATTERSON.

CERTIFICATE OF CORRECTION.

Patent No. 2,173,659.   September 19, 1939.

HERBERT F. PATTERSON.

It is hereby certified that error appears in the printed specification of the above numbered patent requiring correction as follows: Page 5, second column, line 12, strike out the words "as will be presently apparent, will act to move"; line 49, for "sliable" read slidable; page 6, second column, line 20, for "this" read that; line 50, for "rod 11" read rod 111; page 8, first column, line 61, for "levers 39 and 30" read levers 39 and 40; page 10, second column, line 22, claim 16, for "actate" read actuate; page 11, second column, line 22, claim 23, for "adjusting" read adjustable: and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.

pair of friction devices respectively adapted to engage said control elements to vary the drive through the transmission by effecting a change from a relatively slow forward drive to a relatively fast forward drive; and means for effecting pressure fluid operation of said friction devices, including, a selector element adjustable by the driver from a transmission control station corresponding to said relatively slow drive to a second station corresponding to said relatively fast drive, valving means for controlling a supply of fluid under pressure to operate said friction devices by power, and means operably connecting the accelerator pedal and the selector element with said valving means for joint control of said valving means by this pedal and element such that driver adjustment of the selector element from the first said control station to the second control station will either thereupon effect said pressure fluid supply or provide a presetting influence on the valving means so that said pressure fluid supply will be delayed until the driver manipulates the accelerator pedal.

44. In a planetary transmission for an engine driven motor vehicle having a throttle-valve-controlling accelerator pedal adapted for manipulation by the vehicle driver; planetary gearing having rotatable control elements driven thereby; a pair of friction devices respectively adapted to engage said control elements to vary the drive through the transmission by effecting a change from a relatively slow forward drive to a relatively fast forward drive; a selector element adjustable by the driver from a position of control corresponding to said relatively slow drive to a second position of control corresponding to said relatively fast drive; and means adapted for operation either in response to driver adjustment of the selector element or subsequently to driver adjustment of the selector element and in response to predetermined manipulation of said accelerator pedal for controlling engagement of said friction devices to effect the aforesaid transmission drive change.

HERBERT F. PATTERSON.

CERTIFICATE OF CORRECTION.

Patent No. 2,173,659.            September 19, 1939.

HERBERT F. PATTERSON.

It is hereby certified that error appears in the printed specification of the above numbered patent requiring correction as follows: Page 5, second column, line 12, strike out the words "as will be presently apparent, will act to move"; line 49, for "sliable" read slidable; page 6, second column, line 20, for "this" read that; line 50, for "rod 11" read rod 111; page 8, first column, line 61, for "levers 39 and 30" read levers 39 and 40; page 10, second column, line 22, claim 16, for "actate" read actuate; page 11, second column, line 22, claim 23, for "adjusting" read adjustable: and that the said Letters Patent should be read with this correction therein that the same may conform to the record of the case in the Patent Office.

Signed and sealed this 12th day of March, A. D. 1940.

(Seal)            Henry Van Arsdale,
Acting Commissioner of Patents.